(12) United States Patent
Cook et al.

(10) Patent No.: US 6,257,656 B1
(45) Date of Patent: Jul. 10, 2001

(54) VEHICLE BODY PANEL MOUNTING SYSTEM

(75) Inventors: Rob A. Cook, Conrad, MT (US); Derek L. Davis, Denton, TX (US)

(73) Assignee: Paccar INC, Bellevue, WA (US)

( * ) Notice: Subject to any disclaimer, the term of this patent is extended or adjusted under 35 U.S.C. 154(b) by 0 days.

(21) Appl. No.: 09/490,500

(22) Filed: Jan. 25, 2000

(51) Int. Cl.$^7$ ..................................................... B62D 27/06
(52) U.S. Cl. ........................ 296/191; 296/180.2; 16/260; 280/154; 49/465
(58) Field of Search ................................ 296/191, 180.2; 280/848, 154; 16/231, 232, 260; 49/465

(56) References Cited

U.S. PATENT DOCUMENTS

| | | | |
|---|---|---|---|
| 3,416,185 | * 12/1968 | Peterson | ................................. 16/260 |
| 4,925,235 | * 5/1990 | Fingerie | ............................. 296/180.2 |
| 5,947,520 | * 9/1999 | McHorse | ........................ 296/180.2 X |

\* cited by examiner

Primary Examiner—Dennis H. Pedder
(74) Attorney, Agent, or Firm—Sidley & Austin

(57) ABSTRACT

A body panel mounting system for a vehicle has a hinge bar (30), a hinge bracket (32), a hinge pivot stop (34), longitudinal positioning collars (36), a latch bar (38), latch bar fasteners (40), and latch brackets (42). The hinge bar (30) is adapted to removably interlock with each hinge bracket (32) to form a hinge mechanism (44). The hinge bar (30) attaches to a vehicle chassis (24). Each hinge bracket (32) retains an edge of a body panel (22). The hinge pivot stop (34) is adapted to limit the pivotal range of each hinge bracket (32) about the hinge bar (30). The latch bar (38) attaches to the body panel (22) via the latch bar fasteners (40), and the latch bar removably attaches to the chassis (24) via the latch brackets (42).

25 Claims, 6 Drawing Sheets

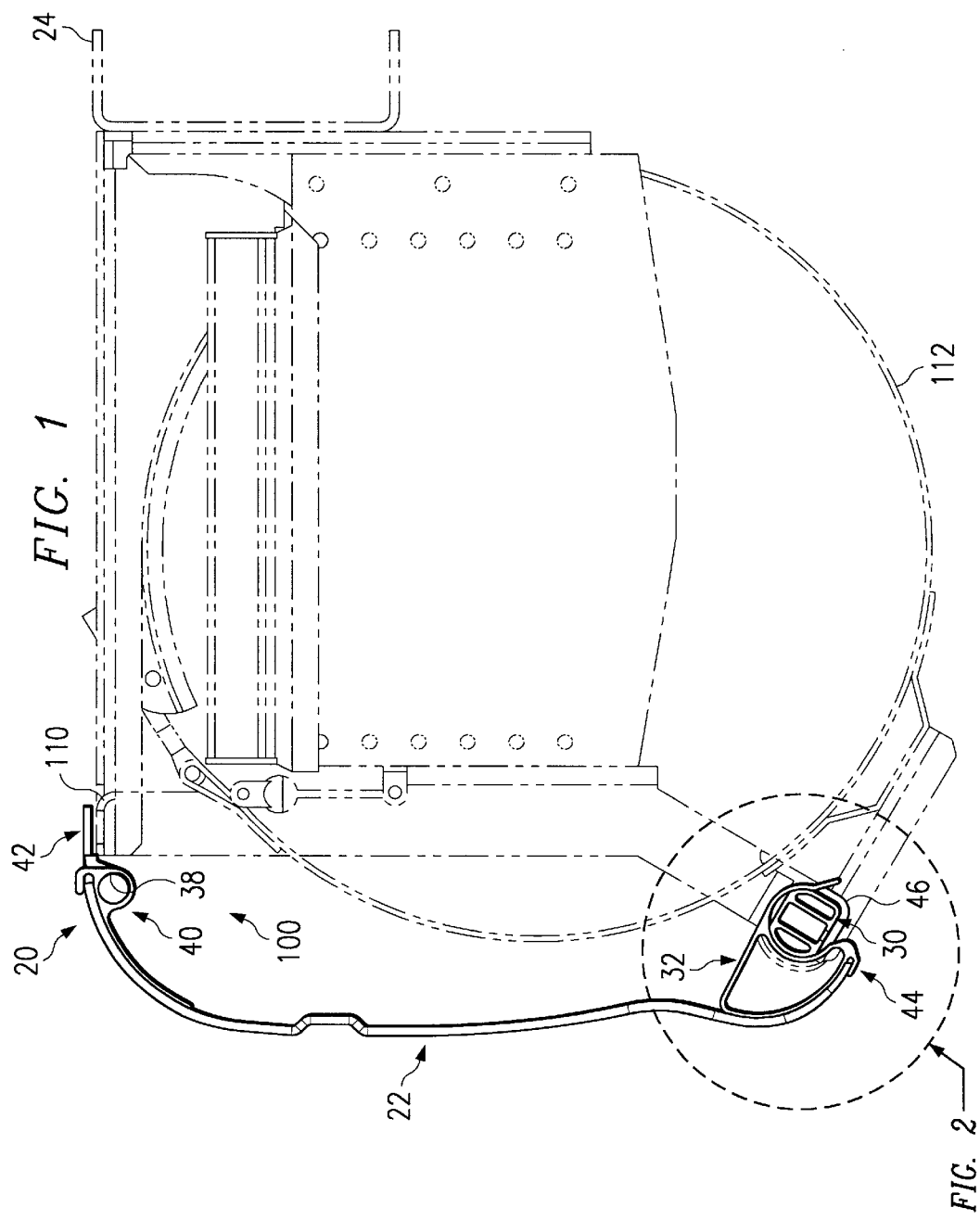

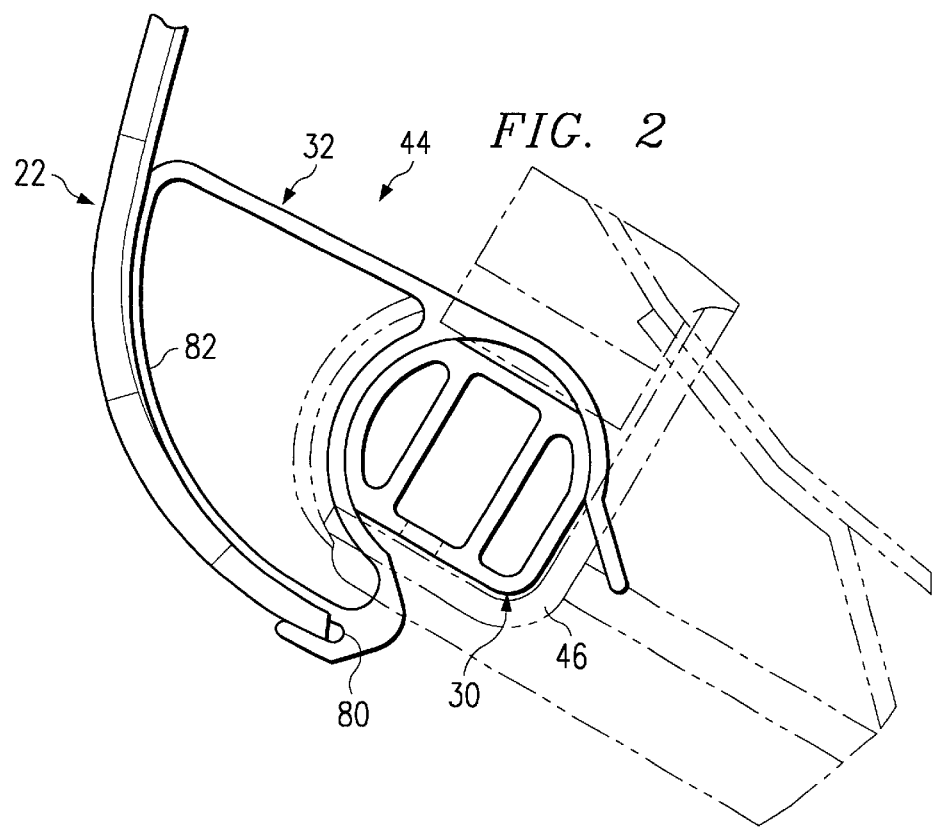
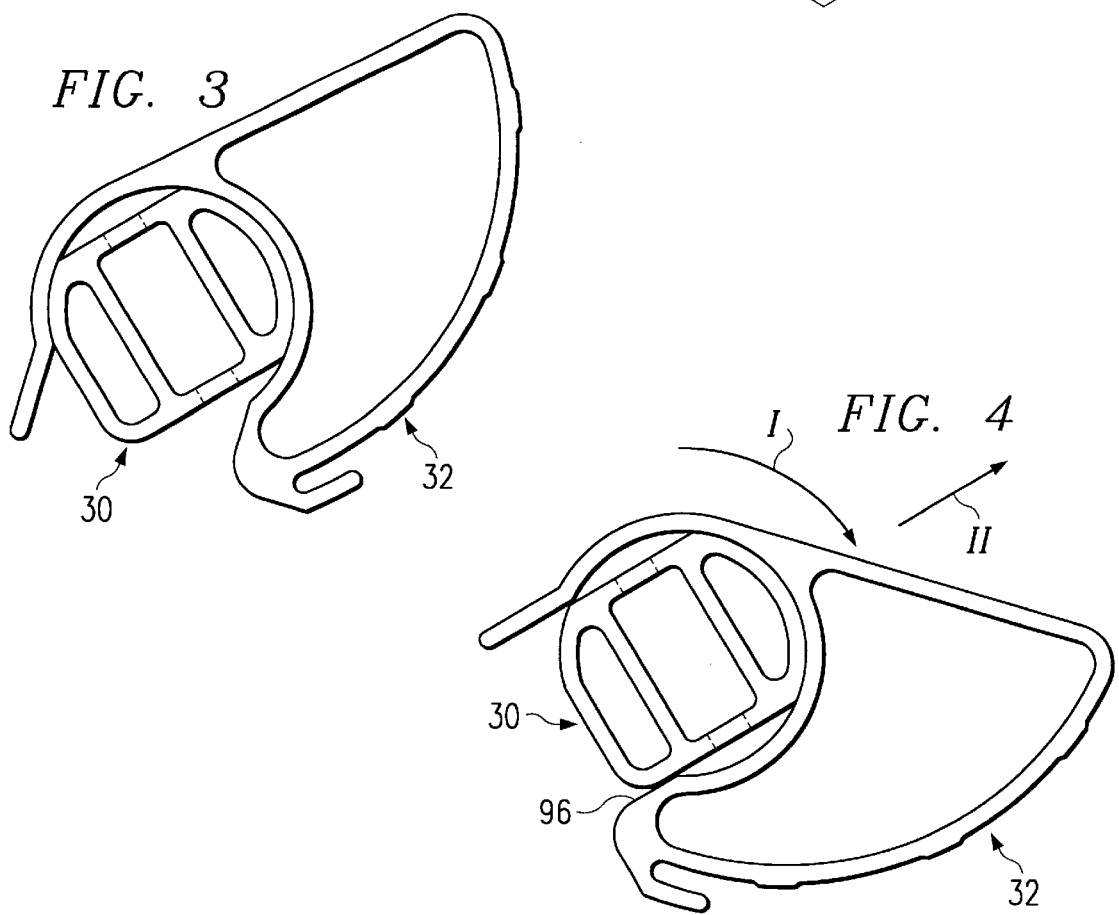

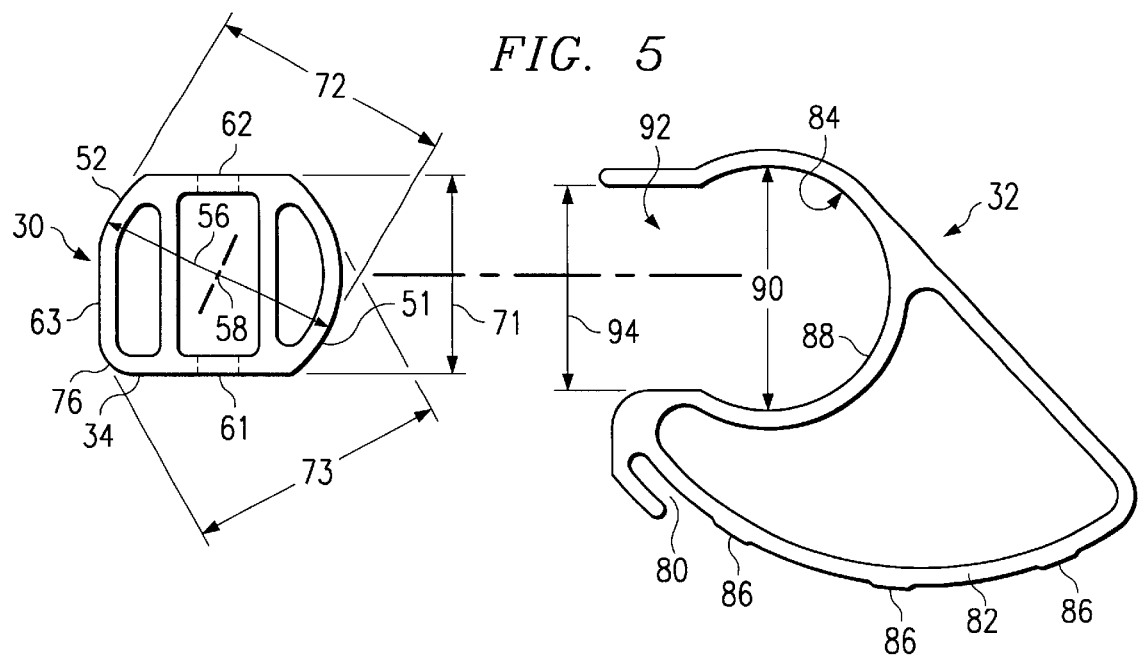
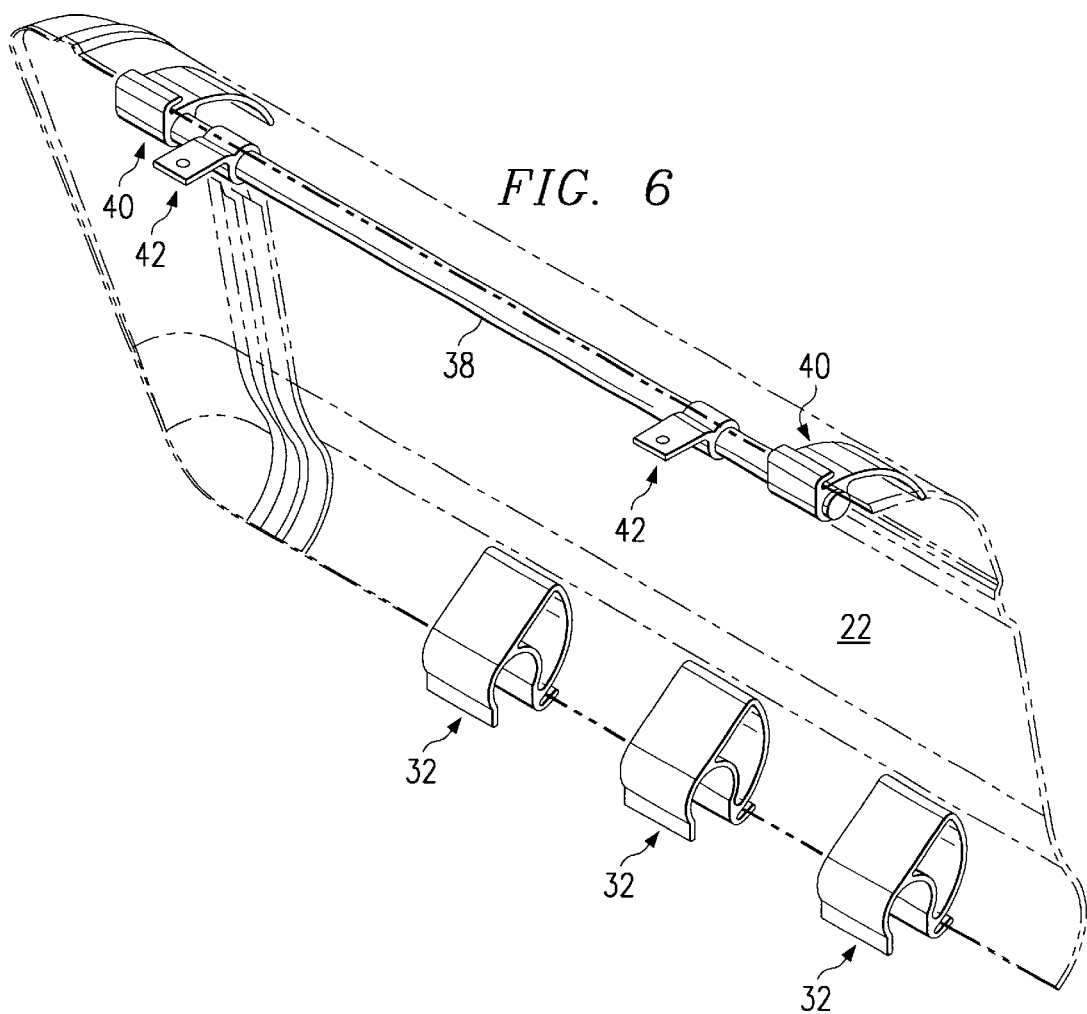

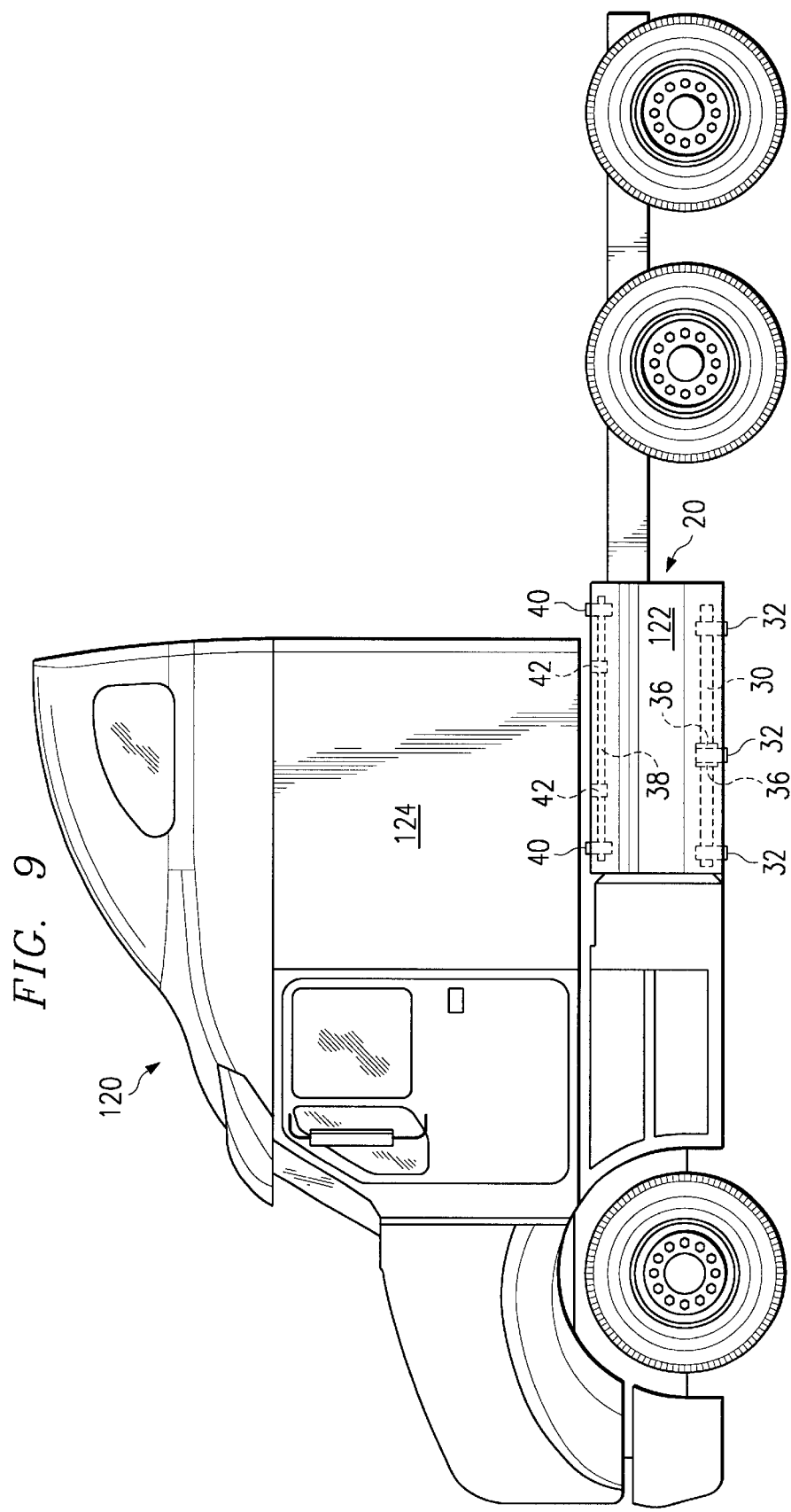

VEHICLE BODY PANEL MOUNTING SYSTEM

TECHNICAL FIELD OF INVENTION

This present invention relates to a vehicle body panel mounting system. In one aspect, it relates to a vehicle body panel mounting system using a hinge and latch combination to fasten a body panel to a vehicle chassis.

BACKGROUND OF INVENTION

There are many commonly known ways to mount a body panel to a vehicle. But, many of these commonly known ways have disadvantages in their design. For example, some body panel mounting systems have a large number of attachments points using only bolts or screws. This makes the removal/installation of the body panel a time consuming and labor intensive process. Also, it does not make it practical to frequently open or remove the body panel to access components behind the body panel. It is often desirable to have easy access to components located behind the body panel. Therefore, a need exists for a body panel mounting system that provides quick and easy removal/installation for access to components located behind a body panel.

Furthermore, many of the commonly known body panel mounting systems do not have a modular design that can be adapted to many different vehicles. For example, some mounting systems are only designed for a left-side body panel. Hence, such mounting systems can not be used to mount a right-side body panel, and different parts would need to be designed and manufactured to mount a right-side body panel. Also, some mounting systems are only designed for one particular size of body panel. Thus, there is a need for a body panel mounting system that can accommodate a variety of body panel shapes and sizes.

Many of the commonly known body panel mounting systems restrain the thermal expansion of the body panel under temperature variations, which can induce stress on the body panel. A vehicle often experiences a large range of temperatures throughout its life (e.g., different seasons, different geographical regions). Hence, there is a need for a body panel mounting system that allows for thermal expansion of the body panel.

SUMMARY OF INVENTION

Many of the needs outlined above are addressed by the present invention hereof. It is an object of the present invention to provide a body panel mounting system that has a minimum number of attachment points that must be unfastened to remove or fastened to install a body panel on a vehicle, thereby decreasing the amount of time and labor required to remove/install the body panel.

It is another object of the present invention to provide a body panel mounting system that has a modular design such that the same part content can accommodate a variety of sizes and shapes of body panels, as well as left and right sides.

It is yet another object of the present invention to provide a body panel mounting system that will allow for length changes in a body panel due to thermal expansion under temperature variations.

In accordance with one aspect of the present invention, a body panel mounting system for a vehicle has a hinge bar, a hinge pivot stop, at least one hinge bracket, two longitudinal positioning collars, a latch bar, at least two latch bar fasteners, and at least one latch bracket.

The hinge bar has a generally D-shaped cross-section having two round sides and three flat sides. Two of the flat sides are generally parallel with each other. Each hinge bracket has a generally C-shaped cross-section. The hinge bar cross-section is adapted to interlock with each hinge bracket cross-section to form a hinge mechanism, except where the opening of each C-shaped hinge bracket cross-section aligns with the two flat sides that are parallel to each other. Thus, the hinge bar cross-section can only be slid into and out of each hinge bracket cross-section when the opening of each C-shaped hinge bracket cross-section is aligned with the two flat sides that are parallel with each other.

The hinge bar can be attached to a chassis of the vehicle. Also, the hinge bar can have a hinge pivot stop formed thereon, which will limit the pivoting of each hinge bracket about the hinge bar. Each hinge bracket is adapted to retain an edge of a body panel. Two longitudinal positioning collars can be attached to the hinge bar. The longitudinal positioning collars are adapted to retain the longitudinal position of a designated hinge bracket along the hinge bar, which in turn defines the longitudinal position of the body panel relative to the chassis when the body panel is installed via the body panel mounting system.

The latch bar fasteners are adapted to retain another edge of the body panel. The latch bar fasteners are attached to the latch bar. Also, the latch bar brackets are slidably connected to the latch bar. The latch bar brackets are adapted to attach to the vehicle chassis and are free to slide along the latch bar while positioning the latch bar brackets during installation of the body panel. Thus, the body panel is hinged to the chassis at one end by the hinge bar and hinge bracket combination and it is latched at another end by the latch bar, latch fastener, and latch bracket combination. The body panel mounting system allows the body panel to pivot about the hinge bar to an open position or to a removal position. At the removal position, the body panel along with each hinge bracket can be slid off the hinge bar, and thus off of the chassis.

In accordance with another aspect of the present invention, a truck incorporates the body panel mounting system for retaining a body panel on the truck chassis.

In accordance with yet another aspect of the present invention, a hinge mechanism for mounting a body panel on a vehicle has a hinge bar and at least one hinge bracket. At least a portion of the hinge bar has a generally cylindrical cross-section with two round outer sides and two flat outer sides. The two round outer sides are opposite each other and have an outside diameter about a common center point. The two flat outer sides are opposite each other and generally parallel to one another. Each hinge bracket has a C-shaped cross-section that is adapted to interlock with the hinge bar to form a hinge mechanism, except when the opening of the C-shaped cross-section of the hinge bracket is aligned with the flat outer sides of the hinge bar. Thus the hinge bar cross-section can be slid into and out of each hinge bracket cross-section at the position where the opening in each hinge bracket cross-section aligns with the flat outer sides of the hinge bar. Each hinge bracket is also adapted to retain a body panel. The hinge bar can be attached to a vehicle chassis. Hence, the body panel can be attached to the chassis via the hinge mechanism formed by the hinge bar and hinge brackets interlocking.

BRIEF DESCRIPTION OF DRAWINGS

Other objects and advantages of the invention will become apparent upon reading the following detailed description and upon reference to the accompanying drawings in which:

FIG. 1 is an end view of a vehicle body panel mounting system according to a first embodiment of the present invention;

FIG. 2 is a detailed view of FIG. 1;

FIG. 3 is an end view of the hinge bar and hinge bracket of the first embodiment in an interlocked position;

FIG. 4 is an end view of the hinge bar and hinge bracket of the first embodiment in a removal/installation position;

FIG. 5 is an end view of the hinge bar and hinge bracket of the first embodiment in a dismembered configuration;

FIG. 6 is an isometric view of the body panel having part of the vehicle body panel mounting system attached thereto according to the first embodiment;

FIG. 9 is a side view of a truck incorporating the vehicle body panel mounting system according to the first embodiment of the present invention;

DETAILED DESCRIPTION OF INVENTION

Figure 7:
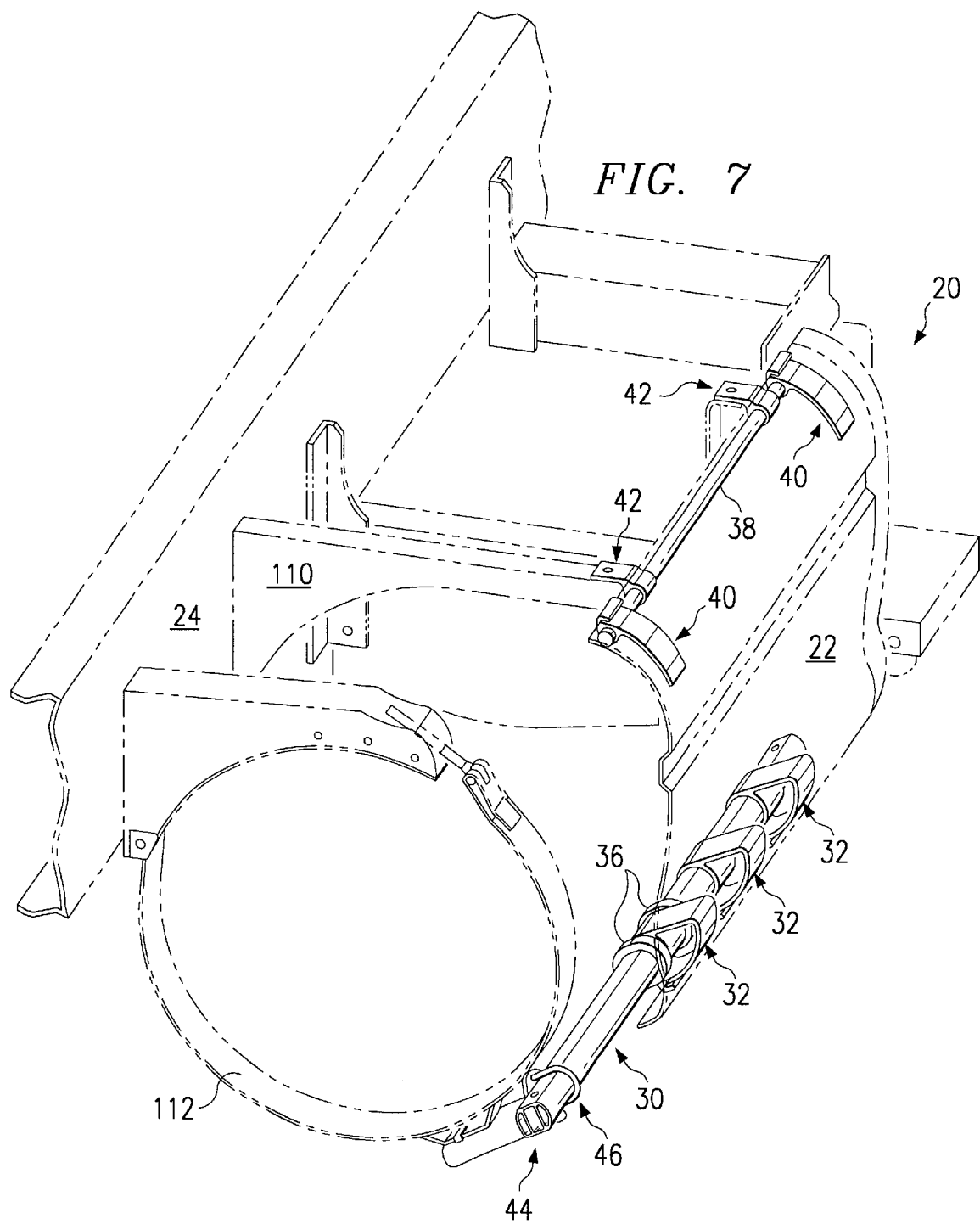
FIG. 7 is an isometric view of the vehicle body panel mounting system according to the first embodiment.

Referring now to the drawings, wherein like reference numbers are used to designate like elements throughout the various views, a first embodiment as well as other possible embodiments and modifications are further described.

FIGS. 1–7 show various views and various portions of a body panel mounting system 20 according to a first embodiment of the present invention. The body panel mounting system 20 uses a hinge and latch combination to removably fasten a vehicle body panel 22 to a vehicle chassis 24. The body panel mounting system 20 shown has a hinge bar 30, three hinge brackets 32, a hinge pivot stop 34, two longitudinal positioning collars 36, a latch bar 38, two latch bar fasteners 40, and two latch brackets 42.

As shown in FIG. 1, the body panel mounting system 20 has a hinge mechanism 44 formed by the interlocking of the hinge bar 30 with the three hinge brackets 32 (only one of which is shown in FIG. 1). As shown in FIGS. 3 and 4, the hinge brackets 32 (only one is shown in FIGS. 3 and 4) can pivot about the hinge bar 30. At the first position (FIG. 3) the hinge bracket 32 is interlocked with the hinge bar 30. To remove a hinge bracket 32 from the hinge bar 30, starting at a first position shown in FIG. 3, the hinge bracket 32 is rotated (as indicated by arrow I) to a second position shown in FIG. 4. At the second position (FIG. 4) the hinge bracket 32 can be laterally slid off of the hinge bar 30 (as indicated by arrow II) to separate and remove the hinge bracket 32 from the hinge bar 30. Hence, the hinge bracket 32 is not interlocked with the hinge bar 30 at the second position (FIG. 4) due to the corresponding geometric configurations of the hinge bar cross-section and each hinge bracket cross-section. As shown in FIGS. 1 and 2, a bottom portion of the body panel 22 is attached to the hinge brackets 32, and the hinge bar 30 is attached to the vehicle chassis 24. Therefore, in the first position (also shown in FIG. 1), the bottom portion of the body panel 22 is secured to the chassis 24 by the hinge mechanism 44 when hinge brackets 32 interlock with the hinge bar 30.

Focusing now on the hinge bar 30 shown in FIGS. 1–6, the hinge bar is an extruded metal bar having a uniform cross-section along its total longitudinal extent. Using an extruded hinge bar 30 with a uniform cross-section provides the advantage of a single part that can be cut to any desired length to accommodate a variety of given body panel lengths. The hinge bar 30 is attached to the vehicle chassis 24 via a first set of chassis brackets 46. Referring now to FIG. 5 for more details, the hinge bar 30 has a generally D-shaped cross-section with first and second round outer sides 51, 52, as well as first, second, and third flat outer sides 61, 62, 63. The first and second round outer sides 51, 52 are opposite each other and lie at a common outer diameter 56 about a common center point 58. The first and second flat outer sides 61, 62 are opposite each other, as well as generally parallel to one another.

The hinge bar cross-section has a first, second, and third width 71, 72, 73. The first width 71 is the distance between the first and second flat outer sides 61, 62. The second width 72 equal to the outer diameter 56 between the first and second round outer sides 51, 52. As a critical criterion for the geometric configuration required to make the hinge brackets 32 interlock with the hinge bar 30, the second width 72 (outer diameter 56) must be greater than the first width 71. The third width 73 is the distance between the first round outer side 51 and the intersection 76 of the first and third flat outer sides 61, 63.

Focusing next on the hinge brackets 32 shown in FIGS. 1–7, the hinge brackets 32 are all the same (see FIG. 6), and each bracket is made by slicing an extruded metal bar having a uniform cross-section along its longitudinal extent. Using an extruded bar with a uniform cross-section to make the hinge brackets 32 provides the advantage of reduced manufacturing costs and ease of making each hinge bracket the same. Hence, the length of the hinge brackets 32 can be cut to any desired size, and the number of hinge brackets 32 used can be easily varied to accommodate a variety of given body panel lengths due to the uniformity of the hinge brackets.

Each hinge bracket 32 has a generally U-shaped slot 80, a curved body portion 82, and a generally C-shaped slot 84. The U-shaped slot 80 is best shown in FIGS. 2 and 5. The U-shaped slot 80 is adapted to receive and retain an edge of the bottom portion of the body panel 22. The body panel 22 also rests against the curved body portion 82 of the hinge bracket 32, which is shaped to follow the contour of the body panel. The body panel 22 is adhesively bonded to the hinge bracket 32. The curved body portion 82 incorporates three humps 86 that provide an offset for an adhesive (not shown) placed between the hinge bracket 32 and the body panel 22. The size of the humps 86 creates an offset that provides a proper gap needed for a strong adhesive bond of a given adhesive. Hence, the size of the humps 86 may vary for different adhesives to provide a gap yielding the optimum bond strength. The U-shaped slot 80 aids in the alignment of the body panel 22 relative to the hinge bracket 32 while bonding the body panel 22 to the hinge bracket.

The C-shaped slot 84 is where the hinge bar 30 interlocks with the hinge bracket 32 over a pivotal range to form the hinge mechanism 44. More specifically, the C-shaped slot 84 has one round inner side 88 of an inner diameter 90, and it has an opening 92 of a fourth width 94. The inner diameter 90 of the C-shaped slot 84 is about the same or slightly greater than the outer diameter 56 of the hinge bar 30 such that each hinge bracket 32 can pivot about the hinge bar 30. The inner diameter 90 is also greater than the fourth width 94 of the opening 92. As a critical criterion for the geometric configuration required to allow the hinge brackets 32 to be removable from the hinge bar 30, the fourth width 94 must be greater than the first width 71 such that the hinge bar cross-section can slide into and out of the opening 92 of the hinge bracket 32 along the first and second flat outer sides 61, 62 of the hinge bar 32. Also, as another critical criterion for the geometric configuration required to make the hinge brackets 32 interlock with the hinge bar 30, the fourth width 94 must be less than the second width 72. (outer diameter 56 of the hinge bar) and less than the third width 73 such that the hinge bar cross-section cannot slide out of the C-shaped slot 84 unless the sliding is along the first and second flat outer sides 61, 62 of the hinge bar. Hence, the hinge bar cross-section interlocks with the C-shaped slot 84 of each hinge bracket 32 over a pivotal range about the hinge bar 30 where the first and second flat outer sides 61, 62 of the hinge bar do not radially align the opening 92 of the hinge bracket.

Referring now to FIGS. 3–5, a hinge pivot stop 34 is formed on the first flat outer side 61 of the hinge bar 30 proximate to the intersection 76 of the first and third flat outer sides 61, 63. In other words, the hinge pivot stop 34 is an extension of the first flat outer side 61 beyond a point where the second round outer side 52 would intersect with the first flat outer side if the arc of the second round outer side were continued through the first flat outer side. The function of the hinge pivot stop 34 is to limit a pivotal rotation of each hinge bracket 32 about the hinge bar 30. As best shown in FIG. 4, a critical criterion for the geometric configuration required to make the hinge pivot stop 34 functional is that third width 73 of the hinge bar cross-section must be greater than the inner diameter 90 of the C-shaped slot 84 and the opening 92 of each hinge bracket 32. Thus, the third width 73 of the hinge bar cross section must also be greater than the first width 71 and the second width 72. Hence, the hinge bar 30 cannot pivot within the hinge brackets 32 when the hinge pivot stop 34 abuts a surface 96 of the hinge bracket outside of the C-shaped slot 84.

The hinge pivot stop 34 provides several advantages. First, the hinge pivot stop 34 limits the pivotal rotation of the hinge brackets 32 at an angular position where the first and second flat outer sides 61, 62 of the hinge bar 30 radially align with the opening 92 of the hinge bracket 32 such that the hinge brackets can be removed from the hinge bar 30. Thus, when removing the body panel 22 from the chassis 24, the body panel can be simply tilted about the hinge bar 30 (as indicated by arrow I in FIG. 4) until the hinge pivot stop 34 limits further pivotal rotation. Then, the body panel 22 can be pulled linearly (as indicated by arrow II in FIG. 4) to remove the body panel from the chassis 24 because the angular position of the hinge brackets 32 at the pivot limit is already aligned such that the hinge bar cross-section will slide out of the C-shaped slot 84 of the hinge brackets. This automatic alignment for removal at the pivot stop limit provided by the hinge pivot stop 34 is due to the geometric configuration of the first embodiment, as described above. The automatic alignment provided by the pivot stop 34 makes the removal of the body panel 22 much easier and safer than if the angular alignment for removal had to be found by pulling linearly while rotating the body panel about the hinge bar 30. A second advantage of incorporating the hinge pivot stop 34 is that it can make the removal of a heavy, large, and/or bulky body panel 22 easier by assisting in the alignment of the hinge brackets 32 at the angular orientation needed for removal and installation. A third advantage of the hinge pivot stop 34 is that it can make it easier to attach the hinge bar 30 to the first set of chassis brackets 46 where, as in the first embodiment shown in FIG. 2, the hinge bar has the third flat outer side 63 that is generally perpendicular to the first and second flat outer sides 61, 62 to form a square-nut-type geometry. This square-nut-type geometry allows a chassis bracket 46 with a square-open-wrench-type geometry, as in the first embodiment shown in FIG. 2, to firmly hold the hinge bar 30 while also preventing rotation of the hinge bar within the chassis bracket. Thus, there are many advantages realized by the implementation of a hinge pivot stop 34.

As shown in FIG. 7, two longitudinal positioning collars 36 are attached to the hinge bar 30. The function of the longitudinal positioning collars 36 is to retain the longitudinal position of a hinge bracket 32 along the longitudinal extent of the hinge bar 30. This is done by having a longitudinal positioning collar 36 fixed to the hinge bar 30 on each end of a hinge bracket 32. Hence, the two longitudinal positioning collars 36 are separated by a spaced distance along the longitudinal extent of the hinge bar 30. This spaced distance is larger than the length of the hinge bracket 32 designated to be retained by the collars 36 such that the hinge bracket fits between the collars and the sliding of the hinge bracket along the longitudinal extent of the hinge bar 30 is limited. But, the designated hinge bracket 32 can still pivot about the hinge bar 30 without being hindered by the collars 36.

FIGS. 1, 6, and 7 show a latch mechanism 100 of the body panel mounting system 20, which includes the latch bar 38, two latch bar fasteners 40, and two latch brackets 42. The latch bar fasteners 40 and latch brackets 42 are attached to the latch bar 38. The latch bar fasteners 40 are all the same (see FIGS. 6–7), and each fastener is made by slicing an extruded metal bar having a uniform cross-section along its longitudinal extent. Using an extruded bar with a uniform cross-section to make the latch bar fasteners 40 provides the advantage of reduced manufacturing costs and ease of making each fastener the same. Hence, the length of the latch bar fasteners 40 can be cut to any desired size, and the number of latch bar fasteners used can be easily varied to accommodate a variety of given body panel lengths due to the uniformity of the latch bar fasteners.

Figure 8:
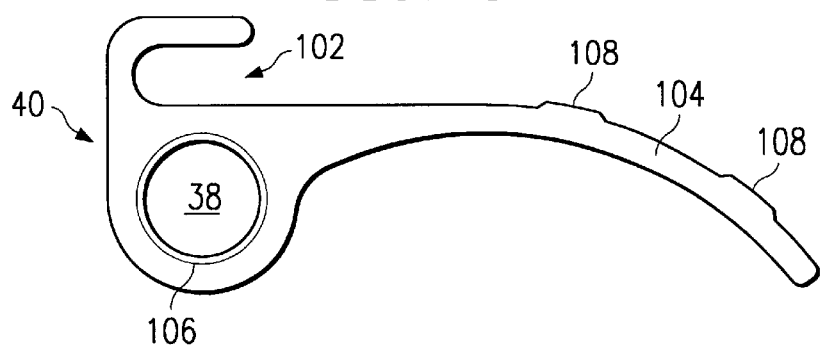
FIG. 8 is an end view of the latch bar fastener and the latch bar of the first embodiment.

More specifically, FIG. 8 shows the cross-section of a latch bar fastener 40 with the latch bar 38 therein. Each fastener 40 has a generally U-shaped slot 102, a curved body portion 104, and a ring portion 106. As on the hinge bracket 32 (described above), the U-shaped slot 102 is adapted to receive and retain an edge of the top portion of the body panel 22. The body panel 22 also rests against the curved body portion 104 of the latch bar fastener 40, which is shaped to follow the contour of the body panel. The body panel 22 is adhesively bonded to the latch bar fastener 40. The curved body portion 104 incorporates two humps 108 that provide an offset for an adhesive (not shown) placed between the latch bar fastener 40 and the body panel 22. The size of the humps 108 creates an offset that provides a proper gap needed for a strong adhesive bond of a given adhesive. Hence, the size of the humps 108 may vary for different adhesives to provide a gap yielding the optimum bond strength. The U-shaped slot 102 aids in the alignment of the body panel 22 relative to the latch bar fastener 40 while bonding the body panel 22 to the latch bar fastener 40.

The ring portion 106 of the latch bar fastener 40 has a cylindrical opening adapted to receive the latch bar 38. The latch bar fastener 40 is removably fixed to the latch bar 38, and each fastener is angularly aligned with each other about the latch bar when attached to the body panel. Hence, each latch bar fastener 40 attaches the top portion of the body panel 22 to the latch bar 38.

Referring to FIGS. 1, 6, and 7 again, each latch bracket 42 is slidably connected to the latch bar 38, and is free to pivot about the latch bar. The latch brackets 42 are adapted to attach to the chassis 24 via a second set of chassis brackets 110. Each latch bracket 42 is the same, and any number of latch brackets can be incorporated in an embodiment. One of the advantages of the latch brackets 42 being capable of independently and freely sliding and pivoting on the latch bar 38 is that it allows for flexible locations of the second set of chassis brackets 110. Hence, the same latch design and parts can be used for a variety of different chassis bracket configurations and a variety of body panel sizes and lengths.

The first embodiment of the present invention described above has many advantages. One advantage is that the same body panel mounting system 20 (using the same parts) can be used for either the left or right side of a vehicle. For example, if the left and right body panels have an essentially identical shape and size, which is desirable because it will save money in design and tooling costs, the hinge brackets 32 and the latch bar fasteners 40 in the first embodiment can attach to either side without changing the design. Another advantage is that due to the modular configuration of the parts, the same mounting system 20 (using the same parts) can be used for a variety of different body panel configurations to fit on numerous different vehicles (i.e., various body panel lengths, heights, and shapes). Also, because the hinge brackets 32 and latch bar fasteners 40 each have a U-shaped slot 80, 102, respectively, many different body panels can be held by the hinge brackets and latch bar fasteners without varying their design. Yet another advantage is that the mounting system 20 minimizes the number of visible fasteners holding the body panel 22 while also providing easy access for body panel removal. Still another advantage of the mounting system 20 is that the body panel 22 can be detached from the chassis 24 or tilted away from the chassis for serviceability simply by removing two bolts at the latch brackets 42. This ability to quickly and easily detach or tilt open the body panel 22 enhances the ability to access other vehicle components or storage compartments located behind the body panel. For example, as shown in FIGS. 1 and 7, the body panel in the first embodiment is designed to cover a cylindrical fuel tank for a truck. The large circular brackets 112 are for holding the fuel tank. A further advantage of the mounting system 20 is that the chassis brackets 46, 110 can be mounted on numerous different locations of the vehicle without affecting the part content of the mounting system. A still further advantage of the mounting system 20 is that the hinge mechanism 44 formed by the hinge bar 30 and the hinge brackets 32 acts as a working hinge while also providing support for the body panel 22 along its longitudinal extent.

Another advantage is that the mounting system 20 allows for length changes of the body panel 22 due to temperature differences without stressing the body panel. The latch bar fasteners 40 and the latch brackets 42 are free to slide longitudinally along the latch bar 38. Also, the hinge brackets 32 are free to slide longitudinally along the hinge bar 30, except the one hinge bar 32 that lies between the longitudinal positioning collars 36. Because the longitudinal position of the body panel 22 is only restrained by one set of collars 36, which restrain only one hinge bracket 32, the body panel can expand or retract in length. This is particular useful in a vehicle that experiences many different temperature cycles over the life of the vehicle. For example, a truck for hauling semi-trailers may travel across a continent within a few days and experience several different temperature zones within just one week. Thus, the mounting system 20 according to the first embodiment may prolong the life of the body panel 22, as well as the paint applied to the body panel, by reducing or eliminating the amount of thermal stress experienced by the body panel.

FIG. 9 shows a truck 120 incorporating the vehicle body panel mounting system 20 according to the first embodiment of the present invention. The hinge bar 30 and hinge brackets 32 are along the bottom of the fairing 122 (i.e., body panel 22) to form the hinge mechanism 44. The latch bar 38, latch bar fasteners 40, and latch brackets 42 are along the top of the fairing 122 to form the latch mechanism 100. Hence, when the latch brackets 42 are detached from the chassis 24, the fairing 122 can be tilted open about the hinge bar 30 (or it can be removed) to access components located behind the fairing (e.g., battery, fuel tank, storage compartment). The present invention allows the components located behind the fairing 122 to be more accessible and it makes serviceability of the components behind the fairing easier. Often a truck manufacturer varies the components contained behind the fairing 122, depending on the intended function of the truck 120. Also, the configuration of the components may vary. With the flexibility of attachment locations for the hinge bar 30 and the latch brackets 42, the present invention adapts to varying locations for the chassis brackets 46, 110. Thus, the manufacturer can easily vary the chassis bracket locations to accommodate different component combinations and configurations behind the fairing 122 without changing the part content of the body panel mounting system 20 that retains the fairing. In addition, truck manufacturers often produce a variety of truck configurations having different sleeper cab sizes (i.e., different lengths and heights), which require various fairing lengths to match. Because the body fairing mounting system 20 is modular, the present invention can accommodate sleeper cab length variations using the same part content.

Figure 10:
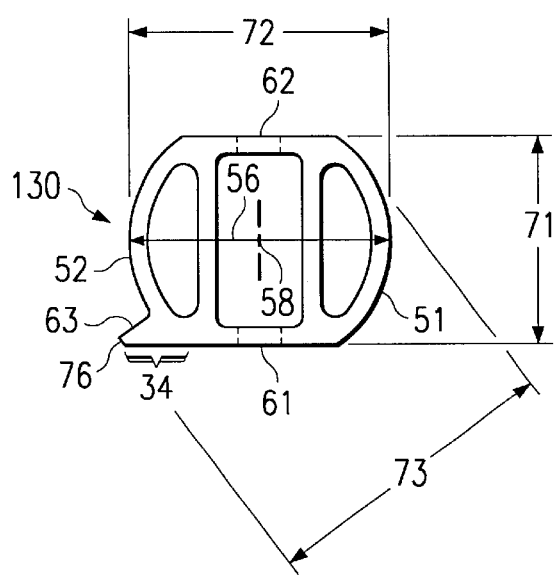
FIG. 10 is an end view of another possible variation of a hinge bar of the present invention.

FIG. 10 shows another possible variation of a hinge bar 130 having a hinge pivot stop 34 formed thereon. Comparing the hinge bar cross-sections of the FIG. 10 hinge bar 130 and the hinge bar 30 of the first embodiment described above (FIG. 5), the first and second flat outer sides 61, 62 as well as the first round outer side 51 are the same as on the first embodiment. However, the third flat outer side 63 and the second round outer side 52 are varied. The arc of the second round side 52 extends farther towards the first flat outer side 61. As a result, the angle formed at the intersection 76 of the first and third flat outer sides 61, 63 is acute, whereas on the first embodiment this angle is a about a 90° angle. The functional result is that a hinge bracket 32 can pivot about the hinge bar 130 over a larger angular range. Thus, the hinge bar 130 of FIG. 10 allows an attached body panel 22 to traverse a larger arc while opening/closing or installing/removing the body panel.

Figure 11:
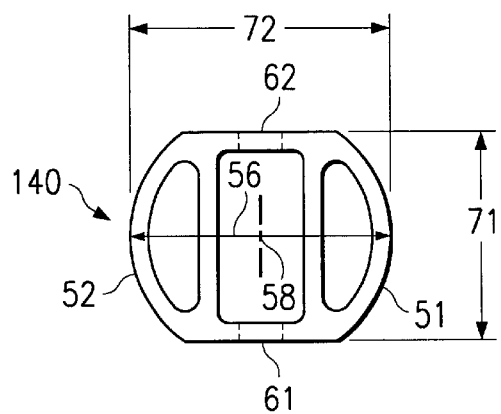
FIG. 11 is an end view of yet another possible variation of a hinge bar of the present invention.

FIG. 11 is yet another possible variation of a hinge bar 140 that is similar to the hinge bar 30 of the first embodiment described above, but without having a hinge pivot stop 34. The FIG. 11 hinge bar 140 has a generally cylindrical cross-section having first and second flat outer sides 61, 62, and first and second round outer sides 51, 52, but no third flat outer side 63. Much like the first embodiment, the first and second flat outer sides 61, 62 are opposite each other and generally parallel to one another. The first and second round outer sides 51, 52 are opposite each other and lie at a common outer diameter 56 about a common center point 58. The advantage to this variation is that without the hinge pivot stop 34, a hinge bracket 32 is free to rotate completely around the hinge bar 140. The disadvantage is that without the hinge pivot stop 34, it may be more difficult to install/ remove the body panel 22 because it may be more difficult to angularly align the first and second flat outer sides 61, 62 with the opening 92 of the C-shaped slot 84 in a hinge bracket 32 (as in FIG. 4). But, the FIG. 11 hinge bar variation still allows for a removable interlocking hinge mechanism 44 similar to the first embodiment.

Figure 12:
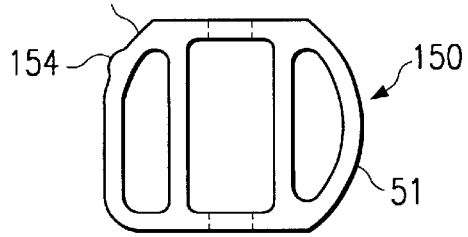
FIG. 12 is an enlarged end view of a further possible variation of a hinge bar of the present invention.

FIG. 12 is a further possible variation of a hinge bar 150, which is also similar to the hinge bar 30 of the first embodiment described above, except that it has the addition of an anti-rattle hump 154. The anti-rattle hump 154 is formed on the second round outer side 52. The diameter between the outermost portion of the anti-rattle hump 154 and the first round outer side 51 is equal to or slightly greater than the inner diameter 90 of the C-shaped slot 84 (see FIG. 5) on a hinge bracket 32. Hence, when the hinge bracket 32 is pivoted to a closed position, as in FIG. 3, the anti-rattle hump 154 will press against the inside of the C-shaped slot 84 of the hinge bracket to create a cam-lock type interface between the two parts. Depending on the size of the hump 154, the flexibility of the material used to form the hinge bracket 32, and the thickness of the hinge bracket, the hinge bracket may even flex slightly due to a deformation caused by the interference of the anti-rattle hump 154 with the inside of the C-shaped slot 84 of the hinge bracket. This cam-lock type interface between the hinge bar 150 and the hinge bracket 32 will keep the hinge bar pressed tightly against the hinge bracket, which will prevent rattling between these parts. The placement, size, and shape of the anti-rattle hump 154 may vary in other possible modifications of this embodiment while still providing the same function and result.

The first embodiment described above, as well as all other embodiments of the present invention, may have many variations. For example, each of the components of an embodiment may be made from various materials, including, but not limited to: aluminum alloys, steel, titanium alloys, thermal plastics, polymers, and composites. Also, the components may be made using various methods, including, but not limited to: extrusion, machining, welding, molding, and forging. The hinge bar 30 may be any length for a given application. The number of attachment points for the hinge bar 30 to the chassis 24 can vary. The hinge bar 30 may be hollow or solid. The hinge bar 30 may have a uniform cross-section along its entire longitudinal extent, or it may have only portions that are adapted to interlock with a hinge bracket 32. The hinge bar 30 may be bent to follow the contour of a given body panel 22. Also, the number of hinge brackets 32 may vary. For example, a longer body panel may need more hinge brackets 32 to support it than a shorter body panel. The length of each hinge bracket 32 may vary. A hinge bracket 32 may have a uniform cross-section along its entire longitudinal extent, or it may have only portions that are adapted to interlock with a hinge bar 30. Similarly, the number of latch bar fasteners 40 may vary, and the length of each latch bar fastener may vary. A latch bar fastener 40 may have a uniform cross-section along its entire longitudinal extent, or it may vary. A hinge bracket 32 and/or a latch bar fastener 40 may or may not have the U-shaped slots 80, 102 (described above) for retaining a body panel 22. Instead, other commonly known ways of fastening a body panel 22 to the mounting system 20 may be incorporated, including, but not limited to: rivets, bolts, bonding, adhesive, and welding. The length of latch bar 38 may be any length for a given application. The latch bar 38 may be hollow or solid. The latch bar 38 may have a uniform cross-section along its entire longitudinal extent, or it may vary. The number and length of each latch bracket 42 may vary. Hence, the number of attachment points for the latch bar 38 to the chassis 24 can vary. For example, a longer body panel may require more latch bar fasteners 40 and/or more latch brackets 42 than a shorter body panel. Therefore, a body panel mounting system 20 according to the present invention can be adapted for a variety of body panel size and shapes. The orientation of a body panel 20 held by the mounting system 20 in its mounted position may vary also (e.g., vertical, horizontal, slanted, upside down). The hinge mechanism 44 could be on top with the latch mechanism 100 on bottom or vice-versa, and the hinge mechanism 44 may be to the right of the latch mechanism 100 or vice-versa. Because body panel contours can vary, the contour of the curve body portion 82 of a hinge bracket 32 and/or the curve body portion 104 of a latch bar fastener 40 may vary accordingly. Furthermore, the curve body portion 82 of a hinge bracket 32 and/or the curve body portion 104 of a latch bar fastener 40 may or may not follow the contour of a given body panel 22, or there may be no curved body portion 82, 104 on a hinge bracket and/or latch bar fastener. A curved body portion 82, 104 of a hinge bracket 32 and/or latch bar fastener 40 may or may not have the humps 86, 108 that bite into a body panel 22 to help retain the body panel within a U-shaped slot 80, 102. The number of longitudinal positioning collars 36 may vary, or there a may be none at all. An advantage of having only one set of collars 36 is that it allows for thermal expansion/retraction of a body panel 22 in the longitudinal direction.

It will be appreciated by those skilled in the art having the benefit of this disclosure that this invention provides a vehicle body panel mounting system using a hinge and latch combination to fasten a body panel to a vehicle chassis. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

The claimed invention is:

1. A hinge mechanism for mounting a body panel on a vehicle, comprising:

a hinge bar adapted to attach to a chassis of said vehicle, at least a portion of said hinge bar having a generally cylindrical cross-section with two round outer sides and two flat outer sides, said two round outer sides lying at a common outer diameter about a common center point, said two flat outer sides being generally parallel to one another, said hinge bar cross-section further having a first width between said two flat outer sides, said hinge bar cross-section having a second width equal to said outer diameter, wherein said outer diameter is greater than said first width; and at least one hinge bracket adapted to removably interlock with said cross-section portion of said hinge bar, said hinge bracket being adapted to retain said body panel, said hinge bracket having a generally C-shaped slot formed therein where said hinge bracket can interlock with said hinge bar cross-section, said C-shaped slot having one rounded inner side of an inner diameter and an opening of an opening width, said inner diameter being greater than said outer diameter such that said hinge bracket can pivot about said portion of said hinge bar, said inner diameter being greater than said opening width, said opening width being greater than said first width such that said hinge bar cross-section can slide into and out of said C-shaped slot of said hinge bracket along said two flat outer sides of said hinge bar cross-section, said opening width being less than said outer diameter such that said portion of said hinge bar can interlock within said hinge bracket over a pivotal range about said hinge bar.

2. A hinge mechanism in accordance to claim 1, further comprising:
a hinge pivot stop formed on one of said two flat outer sides of said portion of said hinge bar, wherein said hinge bar cross-section has a third width between said hinge pivot stop and one of said two round outer sides, said third width being greater than said first and second widths of said hinge bar cross-section, said hinge pivot stop being adapted to limit a pivotal rotation of said hinge bracket about said hinge bar.

3. A hinge mechanism in accordance to claim 1, further comprising:
an anti-rattle hump formed on one of said round outer sides of said hinge bar.

4. A body panel mounting system for a vehicle, comprising:
a hinge bar adapted to attach to a chassis of said vehicle, at least a portion of said hinge bar having a cross-section with two round outer sides and two flat outer sides, said two round outer sides lying at a common outer diameter about a common center point, said two flat outer sides being generally parallel to one another, said hinge bar cross-section having a first width between said two flat outer sides, said hinge bar cross-section having a second width equal to said outer diameter, wherein said outer diameter is greater than said first width;
at least one hinge bracket adapted to removably interlock with said portion of said hinge bar to form a hinge mechanism, said hinge bracket having a first generally U-shaped slot formed therein, said first U-shaped slot being adapted to receive and retain an edge of a body panel, said hinge bracket having a generally C-shaped slot formed therein where said hinge bracket interlocks with said portion of said hinge bar when said hinge mechanism is formed, said C-shaped slot having one rounded inner side of an inner diameter and an opening of an opening width, said inner diameter being greater than said outer diameter such that said hinge bracket can pivot about said hinge bar, said inner diameter being greater than said opening width, said opening width being greater than said first width such that said hinge bar cross-section can slide into and out of said C-shaped slot of said hinge bracket along said two flat outer sides of said hinge bar cross-section, said opening width being less than said outer diameter such that said portion of said hinge bar can interlock within said hinge bracket over a pivotal range about said hinge bar;
a latch bar;
at least two latch bar fasteners attached to said latch bar, said fasteners having a second generally U-shaped slot formed therein, said second U-shaped slot being adapted to receive and retain another edge of said body panel; and
at least one latch bracket connected to said latch bar, said at least one latch bracket being adapted to attach to said vehicle chassis.

5. A body panel mounting system in accordance with claim 4, wherein said at least one latch bracket is slidably connected to said latch bar such that said at least one latch bracket can independently and freely slide along a longitudinal extent of said latch bar.

6. A body panel mounting system in accordance with claim 4, further comprising:
a hinge pivot stop formed on one of said two flat outer sides of said portion of said hinge bar, wherein said hinge bar cross-section has a third width between said hinge pivot stop and one of said two round outer sides, said third width being greater than said first and second widths of said hinge bar cross-section, said hinge pivot stop being adapted to limit a pivotal rotation of said hinge bracket about said hinge bar.

7. A body panel mounting system in accordance with claim 4, further comprising a third flat outer side of said hinge bar cross-section being proximate to said hinge pivot stop and being generally perpendicular to said two flat outer sides of said hinge bar cross-section.

8. A body panel mounting system in accordance with claim 4, further comprising:
two longitudinal positioning collars attached to said hinge bar, said collars separated by a spaced distance along a longitudinal extent of said hinge bar, said spaced distance being greater than a length of said at least one hinge bracket such that said at least one hinge bracket can fit between said collars when placed on said portion of said hinge bar to limit the longitudinal sliding of said at least one hinge bracket along said hinge bar without limiting pivotal rotation of said at least one hinge bracket about said hinge bar.

9. A body panel mounting system in accordance with claim 4, further comprising:
two longitudinal positioning collars attached to said hinge bar, said collars separated by a spaced distance along a longitudinal extent of said hinge bar, said spaced distance being greater than a length of one hinge bracket such that said one hinge bracket can fit between said collars when placed on said portion of said hinge bar to limit the longitudinal sliding of said one hinge bracket along said portion of said hinge bar without limiting pivotal rotation of said one hinge bracket about said hinge bar such that said body panel can expand and retract along a longitudinal extent of said body panel due to temperature changes.

10. A body panel mounting system in accordance with claim 4, wherein said hinge bar is a single-piece extruded metal bar having a uniform cross-section along a total longitudinal extent of said hinge bar.

11. A body panel mounting system in accordance with claim 4, wherein each said at least one hinge bracket is a single piece of extruded metal with a uniform cross-section along a total longitudinal extent of said each hinge bracket.

12. A body panel mounting system in accordance with claim 4, wherein each of said latch bar fasteners is a single piece of extruded metal with a uniform cross-section along a total longitudinal extent of said each latch bar fastener.

13. A body panel mounting system in accordance with claim 4, wherein each said at least one latch bracket is a single piece of extruded metal with a uniform cross-section along a total longitudinal extent of said each latch bracket.

14. A body panel mounting system in accordance with claim 4, wherein said vehicle is a truck having a sleeper cab attached thereto and said body panel is a sleeper fairing.

15. A body panel mounting system in accordance to claim 4, further comprising:

an anti-rattle hump formed on one of said round outer sides of said hinge bar.

16. A body panel mounting system for a vehicle, comprising:

a hinge bar adapted to attach to a vehicle chassis via a first set of chassis brackets, said hinge bar being an extruded metal bar having a generally D-shaped cross-section with first and second round outer sides, and first, second, and third flat outer sides, said first and second round outer sides being opposite each other and lying at a common outer diameter about a common center point, said first and second flat outer sides being generally parallel to one another, said hinge bar cross-section having a first width between said first and second flat outer sides, said hinge bar cross-section having a second width equal to said outer diameter, wherein said outer diameter is greater than said first width, said hinge bar cross-section having a third width between said first round outer side and an intersection of said first and third flat outer sides, said third width being greater than said first and second widths, said hinge bar having a uniform cross-section along a total longitudinal extent of said hinge bar;

at least one hinge bracket adapted to removably interlock with said hinge bar to form a hinge mechanism, said hinge bracket having a first generally U-shaped slot formed therein, said first U-shaped slot being adapted to receive and retain an edge of a body panel, said hinge bracket having a generally C-shaped slot formed therein where said hinge bracket interlocks with said hinge bar when said hinge mechanism is formed, said C-shaped slot having one rounded inner side of an inner diameter and an opening of a fourth width, said inner diameter being about the same diameter as said outer diameter such that said hinge bracket can pivot about said hinge bar, said inner diameter being greater than said fourth width, said fourth width being greater than said first width such that said hinge bar cross-section can slide into and out of said C-shaped slot of said hinge bracket along said first and second flat outer sides of said hinge bar, said fourth width being less than said outer diameter such that said hinge bar can interlock within said hinge bracket over a pivotal range about said hinge bar;

a hinge pivot stop formed on said first flat outer side of said hinge bar proximate to said intersection of said first and third flat outer sides, said hinge pivot stop being adapted to limit a pivotal rotation of said hinge bracket about said hinge bar;

two longitudinal positioning collars attached to said hinge bar, said collars separated by a spaced distance along said longitudinal extent of said hinge bar, said spaced distance being greater than a length of one of said at least one hinge bracket such that said one hinge bracket can fit between said collars when placed on said hinge bar to limit the longitudinal sliding of said one hinge bracket along said hinge bar without limiting pivotal rotation of said one hinge bracket about said hinge bar;

a latch bar;

two latch bar fasteners attached to said latch bar, each of said fasteners having a second generally U-shaped slot formed therein, said second U-shaped slot being adapted to receive and retain another edge of said body panel; and two latch brackets slidably connected to said latch bar such that each of said latch brackets can independently and freely slide along a longitudinal extent of said latch bar, said latch brackets being adapted to attach to said chassis via a second set of chassis brackets.

17. A body panel mounting system in accordance with claim 16, wherein said vehicle is a truck having a sleeper cab attached thereto and said body panel is a sleeper fairing.

18. A body panel mounting system in accordance with claim 16, wherein said third flat outer side of said hinge bar is generally perpendicular to said first and second flat outer sides of said hinge bar.

19. A body panel mounting system in accordance to claim 16, further comprising:

an anti-rattle hump formed on one of said round outer sides of said hinge bar.

20. A truck having a chassis, comprising:

at least one body panel mounting system, said body panel mounting system having a hinge bar, at least one hinge bracket, a latch bar, at least two latch bar fasteners, and at least one latch bracket;

said hinge bar attached to said chassis of said truck, at least a portion of said hinge bar having a cross-section with two round outer sides and two flat outer sides, said two round outer sides lying at a common outer diameter about a common center point, said two flat outer sides being generally parallel to one another, said hinge bar cross-section having a first width between said two flat outer sides, said hinge bar cross-section having a second width equal to said outer diameter, wherein said outer diameter is greater than said first width;

said at least one hinge bracket being adapted to removably interlock with said portion of said hinge bar to form a hinge mechanism, said hinge bracket having a first generally U-shaped slot formed therein, said first U-shaped slot being adapted to receive and retain an edge of a body panel, said hinge bracket having a generally C-shaped slot formed therein where said hinge bracket interlocks with said portion of said hinge bar when said hinge mechanism is formed, said C-shaped slot having one rounded inner side of an inner diameter and an opening of an opening width, said inner diameter being greater than said outer diameter such that said hinge bracket can pivot about said hinge bar, said inner diameter being greater than said opening width, said opening width being greater than said first width such that said hinge bar cross-section can slide into and out of said C-shaped slot of said hinge bracket along said two flat outer sides of said hinge bar cross-section, said opening width being less than said outer diameter such that said portion of said hinge bar can interlock within said hinge bracket over a pivotal range about said hinge bar;

said at least two latch bar fasteners being attached to said latch bar, said fasteners having a second generally U-shaped slot formed therein, said second U-shaped slot being adapted to receive and retain another edge of said body panel; and said at least one latch bracket being slidably connected to said latch bar such that said at least one latch bracket can independently and freely slide along a longitudinal extent of said latch bar, said at least one latch bracket being adapted to attach to said chassis.

21. A truck in accordance with claim 20, wherein said at least one body panel mounting system further comprises a hinge pivot stop formed on one of said two flat outer sides of said portion of said hinge bar, wherein said hinge bar cross-section has a third width between said hinge pivot stop and one of said two round outer sides, said third width being greater than said first and second widths of said hinge bar cross-section, said hinge pivot stop being adapted to limit a pivotal rotation of said hinge bracket about said hinge bar.

22. A truck in accordance with claim 20, wherein said at least one body panel mounting system further comprises two longitudinal positioning collars attached to said hinge bar, said collars separated by a spaced distance along a longitudinal extent of said hinge bar, said spaced distance being greater than a length of said at least one hinge bracket such that said at least one hinge bracket can fit between said collars when placed on said portion of said hinge bar to limit the longitudinal sliding of said at least one hinge bracket along said portion of said hinge bar without limiting pivotal rotation of said at least one hinge bracket about said hinge bar.

23. A truck in accordance with claim 20, said truck having two of said at least one body panel mounting system, one of said two body panel mounting systems being on each side of said truck.

24. A method of removing a body panel that is attached to a vehicle chassis by a body panel mounting system, said body panel mounting system including at least one latch bar bracket, at least one hinge bar, at least one hinge bracket, and at least one pivot stop, comprising the steps of:

unfastening said at least one latch bar bracket from said vehicle chassis, said at least one latch bar bracket being connected to said body panel;

pivoting said body panel about said at least one hinge bar via said at least one hinge bracket, said at least one hinge bar being attached to said chassis, said at least one hinge bracket being attached to said body panel, and said at least one hinge bracket can interlock with said at least one hinge bar to form a hinge mechanism except at one angular position about said at least one hinge bar;

pivoting said body panel about said at least one hinge bar via said at least one hinge bracket until said at least one hinge bracket abuts said at least one pivot stop at said one angular position about said at least one hinge bar where said at least one hinge bracket is free to slide off of said at least one hinge bar, said at least one pivot stop being formed on said at least one hinge bar;

sliding said at least one hinge bracket and said body panel off of said at least one hinge bar; and separating said body panel from said chassis.

25. A method of installing a body panel that is attached to a vehicle chassis by a body panel mounting system, said body panel mounting system including at least one latch bar bracket, at least one hinge bar, at least one hinge bracket, and at least one pivot stop, comprising the steps of:

positioning said body panel at an predetermined angular orientation relative to said at least one hinge bar, said body panel having said at least one hinge bracket attached thereto, said at least one hinge bracket being adapted to interlock with said at least one hinge bar to form a hinge mechanism except at said predetermined angular orientation about said at least one hinge bar, said at least one hinge bracket being able to slide on and off of said at least one hinge bar at said predetermined angular orientation, said at least one hinge bar being attached to said vehicle chassis;

sliding said at least one hinge bracket and said body panel onto said at least one hinge bar at said predetermined angular orientation until said at least one hinge bracket abuts said at least one hinge bar;

pivoting said body panel about said at least one hinge bar via said at least one hinge bracket until said body panel is in a closed position; and fastening said at least one latch bar bracket to said vehicle chassis, said at least one latch bar bracket being connected to said body panel.

* * * * *